(12) United States Patent
Arkhipov et al.

(10) Patent No.: US 11,887,155 B2
(45) Date of Patent: Jan. 30, 2024

(54) METHOD AND A SYSTEM FOR SELECTING A TARGETED MESSAGE TO BE INCLUDED WITHIN A WEB RESOURCE

(71) Applicant: YANDEX EUROPE AG, Lucerne (CH)

(72) Inventors: Maksim Alekseevich Arkhipov, Moscow (RU); Vasily Vadimovich Astakhov, Moscow (RU); Andrey Gennadevich Kochurov, Oryel (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 0 days.

(21) Appl. No.: 17/535,440

(22) Filed: Nov. 24, 2021

(65) Prior Publication Data
US 2022/0172248 A1    Jun. 2, 2022

(30) Foreign Application Priority Data

Nov. 30, 2020  (RU) .......................... RU2020139238

(51) Int. Cl.
G06Q 30/0251   (2023.01)
G06Q 30/0273   (2023.01)
G06Q 30/0241   (2023.01)

(52) U.S. Cl.
CPC ..... *G06Q 30/0254* (2013.01); *G06Q 30/0273* (2013.01); *G06Q 30/0277* (2013.01)

(58) Field of Classification Search
CPC ........... G06Q 30/0254; G06Q 30/0273; G06Q 30/0277
See application file for complete search history.

(56) References Cited

U.S. PATENT DOCUMENTS

| | | | |
|---|---|---|---|
| 7,797,187 B2* | 9/2010 | Crean | G06Q 30/0207 705/14.1 |
| 9,241,174 B1* | 1/2016 | Rogers | H04N 21/23103 |
| 9,298,779 B1 | 3/2016 | Zhou et al. | |
| 10,521,829 B2 | 12/2019 | Dasdan et al. | |
| 2003/0233375 A1* | 12/2003 | Sagar | H04L 9/40 |

(Continued)

FOREIGN PATENT DOCUMENTS

RU    2648951 C1    3/2018

OTHER PUBLICATIONS

Miyazawa, Sparge Regression Model to Predict a Server Load for Dynamic Adjustments of Server Resources, Feb. 1, 2019; IEEE.*

(Continued)

*Primary Examiner* — Arthur Duran
(74) *Attorney, Agent, or Firm* — BCF LLP

(57) ABSTRACT

There is disclosed a method and system for selecting one or more targeted messages to be included within a web resource. The method comprises: receiving a first request for a targeted message, the request including a target context parameter and a target floor price; executing an MLA configured to generate a first confidence parameter vis-a-vis a first server and a second confidence parameter vis-a-vis a second server; transmitting a second request to a selected one of the first server and the second server based on the first confidence parameter and the second confidence parameter; receiving the targeted message from the selected on of the first server and the second server; transmitting the targeted message to the a web server for inclusion within the web resource.

18 Claims, 8 Drawing Sheets

| Request | target context parameter | target floor price | 126 | 128 |
|---|---|---|---|---|
| 302 | AAA | 5 ¢ | ✓ | |
| 304 | BBB | 7 ¢ | ✗ | ✓ |
| 306 | CCC | 4 ¢ | ✓ | |
| 308 | DDD | 10 ¢ | ✗ | ✓ |
| ⋮ | ⋮ | ⋮ | ⋮ | ⋮ |

(56) References Cited

U.S. PATENT DOCUMENTS

| | | | |
|---|---|---|---|
| 2007/0233864 A1 | 10/2007 | Xie et al. | |
| 2010/0100911 A1* | 4/2010 | Ramakrishnan | H04N 21/47202 |
| | | | 725/98 |
| 2010/0131441 A1 | 5/2010 | Gruenhagen et al. | |
| 2012/0004961 A1* | 1/2012 | Flynn | G06Q 30/0251 |
| | | | 705/14.5 |
| 2013/0132544 A1* | 5/2013 | Krishnan | H04W 4/18 |
| | | | 709/223 |
| 2014/0058849 A1* | 2/2014 | Saifee | G06Q 30/0275 |
| | | | 705/14.71 |
| 2014/0136647 A1* | 5/2014 | Moon | H04L 45/00 |
| | | | 709/214 |
| 2017/0243244 A1* | 8/2017 | Trabelsi | G06Q 30/0255 |
| 2018/0247325 A1* | 8/2018 | Melzer | G06Q 30/0206 |
| 2019/0205974 A1 | 7/2019 | Monkman et al. | |
| 2019/0213658 A1* | 7/2019 | Bhattacherjee | G06Q 20/12 |
| 2022/0263725 A1* | 8/2022 | Mayer Zu Eissen | H04L 41/147 |

OTHER PUBLICATIONS

Koobkrabee, Target Advertising Classification using Combination of Deep Learning and Text model, Mar. 1, 2019, IEEE.*
Russian Search Report dated Dec. 8, 2022 issued in respect of the counterpart Russian Patent Application No. RU 2020139238.

* cited by examiner

| Request | target context parameter | target floor price | 126 | 128 |
|---|---|---|---|---|
| 302 | AAA | 5¢ | ✓ | |
| 304 | BBB | 7¢ | ✗ | ✓ |
| 306 | CCC | 4¢ | ✓ | |
| 308 | DDD | 10¢ | ✗ | ✓ |
| ... | ... | ... | ... | ... |

FIG. 3

METHOD AND A SYSTEM FOR SELECTING A TARGETED MESSAGE TO BE INCLUDED WITHIN A WEB RESOURCE

CROSS-REFERENCE

The present application claims priority to Russian Patent Application No. 2020139238, entitled "Method and a System for Selecting a Targeted Message to Be Included Within a Web Resource", filed Nov. 30, 2020, the entirety of which is incorporated herein by reference.

FIELD

The present technology relates to a method and system for training a machine learning algorithm (MLA) in general, and specifically to a method and system for selecting a targeted message to be included within web resource.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

While navigating on the Internet, a given user is exposed to a plurality of online marketing targeted messages. Online marketing is the practice of using web-based channels to spread a message about products, or services to its potential customers.

Generally speaking, a web resource works with one or more advertising application, such as Google AdSense™ and Yandex's Advertising Network™ applications. Advertising application aggregates advertisement from various advertisers and in response to receiving a request from a website, the advertising application selects relevant targeted messages to be provided to the website.

The process of selecting a targeted message can be summarized as follows. First, a request is transmitted to the advertising application, which will transmit the request to a first advertising network. The request contains a target context parameter and a target floor price (also known as a reserve price). The first advertising network then verifies if a targeted message of a plurality of targeted messages stored therein would be a good match to the request. In other words, the first advertising network verifies if a targeted message meets the target context parameter and the target floor price. If the first advertising network finds a targeted message, it transmits the targeted message to the advertising application. On the other hand, if the first advertising network does not identify a targeted message, the first advertising network transmits a rejection. The advertising application then transmits another request to a second advertising network and so on.

Needless to say, the above explained process can take significant amount of time (as well as computational power) and every sequential request is a potential loss of opportunity to monetize, since the user can scroll down the web resource or quit without having seen the selected targeted message(s).

U.S. Pat. No. 10,521,829 B2 entitled "Dynamic Ordering of Online Advertisement Software Steps" published on Feb. 9, 2017 and assigned to Amobee Inc., discloses at a bid determination platform, an initial sequence having an initial order of software steps for filtering advertisements in response to receiving an advertisement bid request is selected. Until a trigger event occurs, the initial sequence of software steps is implemented in the initial order in response to receiving advertisement bid requests. Implementing the initial sequence comprises automatically tracking a failure (or success) metric and resource requirement metric for each of the software steps. After the trigger event occurs, a first optimum sequence of the software steps is automatically selected in a first optimum order so as to optimize a total resource usage for execution of the software steps. Selecting the first optimum sequence of the software steps in the first optimum order is based on the tracked failure (or success) metric and resource requirement metric for each of the software steps during implementation of the initial sequence.

SUMMARY

It is an object of the present technology to provide improved method and systems for selecting a targeted message to be included within a web resource.

Typically, the advertising application stores a log of the requests received and their respective outcome, such as the detail of the request (target context parameter and floor price) as well as information indicative of the request being answered or not by one or more advertising networks.

The developers of the present technology hypothesize that a likelihood of a request being answered by a given advertising network may be determined by using the log of the past requests. In other words, the developers of the present technology have developed embodiments thereof based on a premise that by using historical data, a machine learning algorithm (MLA) can be trained to determine which of the advertising network would likely answer the request. Alternatively, it is contemplated that the MLA can also be trained to determine which of the advertising network would likely answer the request with a highest bid.

In accordance with a first broad aspect of the present technology, there is a provided method for selecting one or more targeted messages to be included within a web resource, the method being executable on a server accessible by a web server hosting the web resource, a first targeted message database and a second targeted message database, the first targeted message server storing a first plurality of targeted messages and the second targeted message server storing a second plurality of targeted messages; each targeted message of the first plurality of targeted messages and second plurality of targeted messages being associated with a context parameter and a bid price; the method comprising: receiving, by the server, from the web server, a first request for the one or more targeted messages, the first request including a target context parameter and a target floor price; executing, by the server, a machine learning algorithm (MLA), the MLA configured to generate, based on the target context parameter and the target reserve price; a first confidence parameter associated with the first targeted message server, the first confidence parameter being indicative of a likelihood of one of the first plurality of targeted messages being a targeted message meeting at least a first condition and a second condition; the first condition corresponding to the context parameter of the targeted message matching the target context parameter, and the second condition corresponding to the bidding price being above the target floor price; a second confidence parameter associated with the second targeted message server, the second confidence parameter being indicative of the likelihood of one of the second plurality of targeted message being the targeted message meeting at least the first condition and the second condition; transmitting, by the server, a second request to a selected one of the first targeted message server and the second targeted message server based on the first confidence parameter and the second confidence parameter, the second request including the target context parameter and the target floor price; receiving, by the server, the targeted message from the selected one of the first targeted message server and the second targeted message server; transmitting, by the server, the targeted message to the web server for inclusion within the web resource.

In some non-limiting embodiments of the method, transmitting the second request to the selected one of the first targeted message server and the second targeted message server based on the first confidence parameter and the second confidence parameter comprises transmitting the second request to the first targeted message server in response to the first confidence parameter being above the second confidence parameter.

In some non-limiting embodiments of the method, the method further comprises, in response to receiving the targeted message meeting the first condition and the second condition from the first targeted message server, not transmitting any request to the second targeted message server.

In some non-limiting embodiments of the method, the method further comprising: receiving, from the selected one of the first targeted message server and the second targeted message server, a response packet indicative of the first plurality of targeted messages not including the targeted message meeting at least the first condition and the second condition; transmitting the second request to another one of the first targeted message server and the second targeted message server.

In some non-limiting embodiments of the method, the first request is transmitted by the web server to the server in response to an electronic device accessing the web resource.

In some non-limiting embodiments of the method, the method further comprising training the MLA.

In some non-limiting embodiments of the method, training the MLA comprises: generating a training dataset by: retrieving, by the server, from a database, a processing log, the processing log comprising: one or more previously received requests for targeted messages, each of the one or more previously received requests including a respective target context parameter and a respective target floor price, the one or more previously received requests having been previously completed by at least one of the first targeted message server and the second targeted message server; training the MLA, the training including: determining, by the server, a set of features associated with the training dataset, the set of features including at least: a success feature, the success feature being indicative of a relation between a given previously received request's target context parameter, the target reserve price, and an indication of whether the first targeted message server or the second targeted message server having completed the given previously received request; generating an inferred function based on the set of features, the inferred function being configured to determine the first confidence parameter and the second confidence parameter based on the target context parameter and the target floor price.

In some non-limiting embodiments of the method, the one or more previously received requests for targeted messages comprise a first set of previously received requests, the first set of previously received requests having been transmitted to the first targeted message server; the first success parameter being generated based on: analyzing, for each of the previously received requests included within the first set of previously received requests, a presence of a response packet including a respective targeted message for each of the previously received requests meeting the respective first condition and the second condition.

In some non-limiting embodiments of the method, the first targeted message server and the second targeted message server is part of a plurality of targeted message servers, and wherein the transmitting the second request to the selected one of the first targeted message server and the second targeted message server comprises transmitting the second request to the both of the first targeted message server and the second targeted message server in response to the first confidence parameter and the second confidence parameter being higher than other confidence parameters associated with other ones of the plurality of targeted message servers.

In some non-limiting embodiments of the method, the method comprises accepting a first response from one of the first targeted message server and the second targeted message server, the first response being an earlier received one.

In some non-limiting embodiments of the method, transmitting the second request to the both of the first targeted message server and the second targeted message server comprises transmitting the second request simultaneously to the both of the first targeted message server and the second targeted message server.

In some non-limiting embodiments of the method, the first confidence parameter and the second confidence parameter being higher than other confidence parameters associated with other ones of the plurality of targeted message servers is indicative of a higher likelihood of receiving a response with a higher reserve price.

In some non-limiting embodiments of the method, the transmitting the second request to the both of the first targeted message server and the second targeted message server comprises transmitting the second request in a sequence to the both of the first targeted message server and the second targeted message server, the sequence being based on values of associated the first confidence parameter and the second confidence parameter.

In accordance with another broad aspect of the present technology, there is disclosed a system for selecting one or more targeted messages to be included within a web resource, the system comprising a server accessible by a web server hosting the web resource, a first targeted message database and a second targeted message database, the first targeted message server storing a first plurality of targeted messages and the second targeted message server storing a second plurality of targeted messages; each targeted message of the first plurality of targeted messages and second plurality of targeted messages being associated with a context parameter and a bid price; the server comprising a processor configured to: receive, from the web server, a first request for the one or more targeted messages, the first request including a target context parameter and a target floor price; execute, a machine learning algorithm (MLA), the MLA configured to generate, based on the target context parameter and the target reserve price; a first confidence parameter associated with the first targeted message server, the first confidence parameter being indicative of a likelihood of one of the first plurality of targeted messages being a targeted message meeting at least a first condition and a second condition; the first condition corresponding to the context parameter of the targeted message matching the target context parameter, and the second condition corresponding to the bidding price being above the target floor price; a second confidence parameter associated with the second targeted message server, the second confidence parameter being indicative of the likelihood of one of the second plurality of targeted message being the targeted message meeting at least the first condition and the second condition; transmit, a second request to a selected one of the first targeted message server and the second targeted message server based on the first confidence parameter and the second confidence parameter, the second request including the target context parameter and the target floor price; receive, the targeted message from the selected one of the first targeted message server and the second targeted message server; transmit, the targeted message to the web server for inclusion within the web resource.

In some non-limiting embodiments of the system, to transmit the second request to the selected one of the first targeted message server and the second targeted message server based on the first confidence parameter and the second confidence parameter comprises to transmit the second request to the first targeted message server in response to the first confidence parameter being above the second confidence parameter.

In some non-limiting embodiments of the system, the processor is further configured to, in response to receiving the targeted message meeting the first condition and the second condition from the first targeted message server, not transmit any request to the second targeted message server.

In some non-limiting embodiments of the system, the processor being further configured to: receive, from the selected one of the first targeted message server and the second targeted message server, a response packet indicative of the first plurality of targeted messages not including the targeted message meeting at least the first condition and the second condition; transmit the second request to another one of the first targeted message server and the second targeted message server.

In some non-limiting embodiments of the system, the processor being further configured to: receive, from the selected one of the first targeted message server and the second targeted message server, a response packet indicative of the first plurality of targeted messages not including the targeted message meeting at least the first condition and the second condition; transmit the second request to another one of the first targeted message server and the second targeted message server.

In some non-limiting embodiments of the system, the first request is transmitted by the web server to the server in response to an electronic device accessing the web resource.

In some non-limiting embodiments of the system, the first targeted message server and the second targeted message server is part of a plurality of targeted message servers, and wherein to transmit the second request to the selected one of the first targeted message server and the second targeted message server, the processor is configured to transmit the second request to the both of the first targeted message server and the second targeted message server in response to the first confidence parameter and the second confidence parameter being higher than other confidence parameters associated with other ones of the plurality of targeted message servers.

In some non-limiting embodiments of the system, the processor is configured to accept a first response from one of the first targeted message server and the second targeted message server, the first response being an earlier received one.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 is a schematic illustration of a processing log compiled by an advertisement application of the system of FIG. 1.

DETAILED DESCRIPTION

Figure 1:
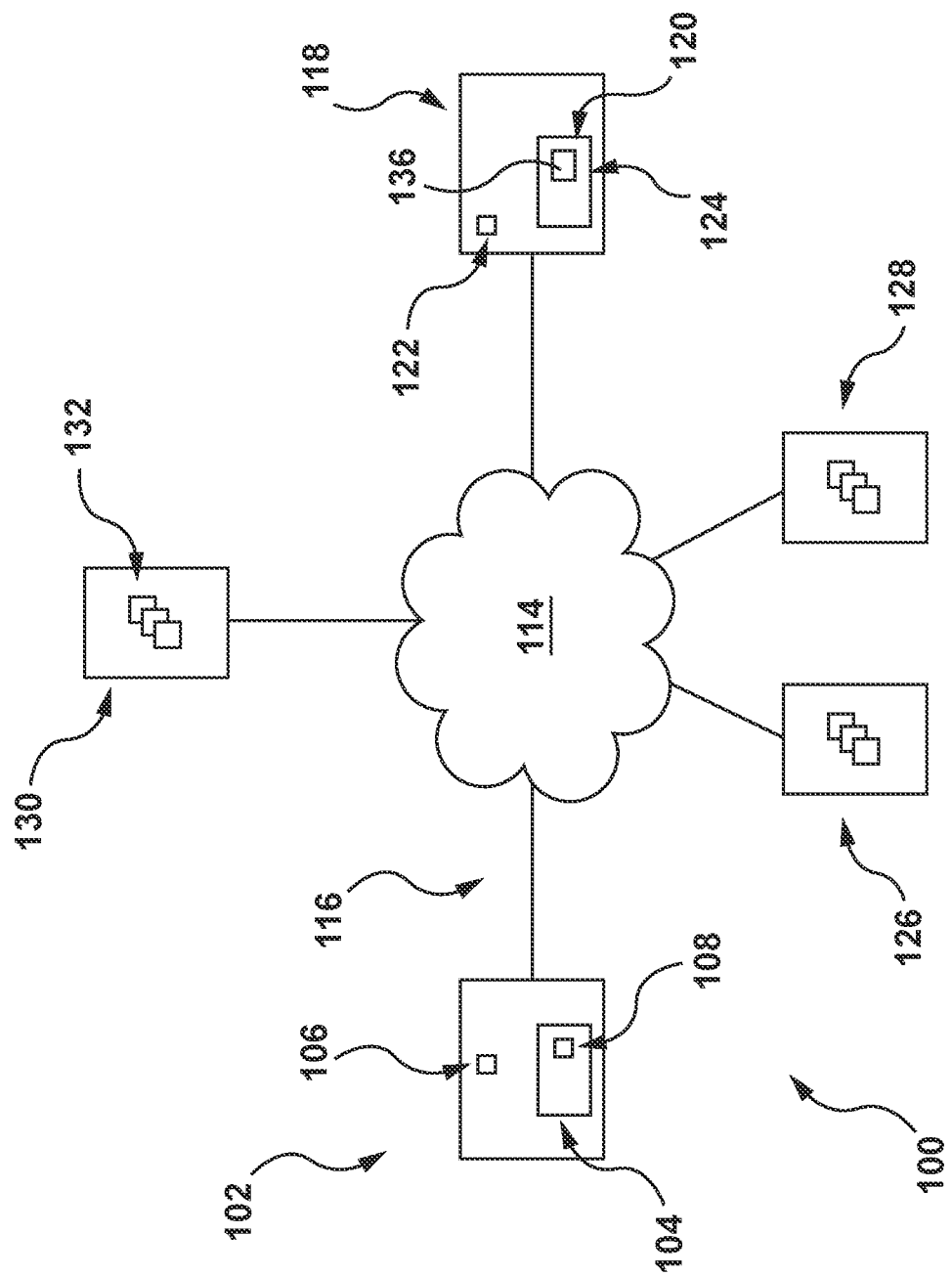
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 includes a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 includes hardware and/or software and/or firmware (or a combination thereof) to execute a browser application 108. Generally speaking, the purpose of the browser application 108 is to enable the user to navigate the Internet. The manner in which the browser application 108 is implemented is known in the art and will not be described herein. Suffice it to say that the browser application 108 may be implemented as a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, a query interface (not shown). How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or Wi-Fi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116, and the communication network 114. As such, by no means the examples provided hereinabove are meant to limit the scope of the present technology.

The system 100 further includes a server 118 coupled to the communication network 114. The server 118 can be implemented as a computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The server 118 includes a communication interface (not depicted) structured and configured to communicate with various entities (such as the electronic device 102 and other devices potentially coupled to the communication network 114) via the communication network 114. The server 118 includes a server memory 120 which includes one or more storage media and generally provides a place to store computer-executable program instructions executable by a server processor 122. By way of example, the server memory 120 may be implemented as a tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments, the server 118 can be operated by the same entity that has provided the aforedescribed browser application 108. For example, if the browser application 108 is a Yandex.Navigator™ application, the server 118 can be operated by Yandex LLC of Lev Tolstoy Street, No. 16, Moscow, 119021, Russia. In alternative embodiments, the server 118 can be operated by an entity different from the one that has provided the aforementioned browser application 108.

In some non-limiting embodiments of the present technology, the server 118 provides an advertisement application 124 (such as Yandex.Direct™ application). The manner in which the advertisement application 124 is implemented is described in detail below.

The server 118 is communicatively coupled to a web server 130 coupled to the communication network 114. The web server 130 can (but does not have to) be implemented in a similar manner to the server 118. In the depicted embodiments of the present technology, the web server 130 is a single server. In alternative non-limiting embodiments of the present technology, the functionality of the web server 130 may be distributed and implemented via multiple servers.

In some non-limiting embodiments of the technology, the web server 130 functions as a repository for a plurality of web resources 132 (not individually numbered).

Generally speaking, the user of the electronic device 102 can access one of the web resources stored within the web server 130 via the communication network 114 by two principle means. The given user can access a particular web resource directly, either by typing an address of the web resource (typically an URL or Universal Resource Locator, such as www.example.com) into a command interface of the browser application 108 or by clicking a link in an e-mail or in another web resource (which action will in a sense "copy and paste" the URL associated with the link into the command interface).

Alternatively, the given user may conduct a search using a search engine application (not shown) to locate a resource of interest based on the user's search intent. The latter is particularly suitable in those circumstances, where the given user knows a topic of interest, but does not know the URL of the web resource she or he is interested in. The search engine application typically returns a search engine result page (SERP) containing links to one or more web resources that are responsive to the user query. Again, upon the user clicking one or more links provided within the SERP the user can open the required web resource.

Figure 2:
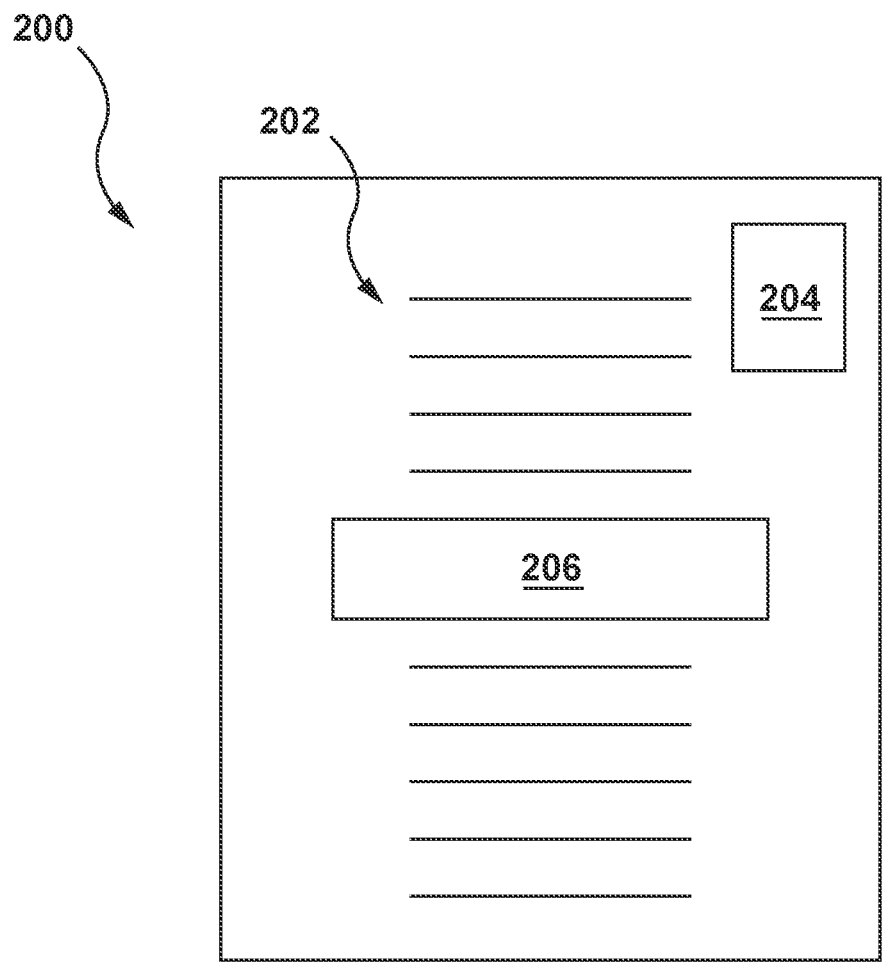
FIG. 2 is a schematic illustration of a web resource that is accessed by a browser application of the system of FIG. 1.

With reference to FIG. 2, there is depicted a non-limiting schematic illustration of a web resource 200 that is accessed by the browser application 108.

The web resource 200 comprises a body of text 202, and two targeted message slots for accommodating a targeted message, namely a first slot 204 and a second slot 206.

In some non-limiting embodiments of the present technology, the web resource 200 may correspond to a SERP that is generated by the search engine application as opposed to a web resource that is stored within the web server 130.

In some non-limiting embodiments of the present technology, the advertisement application 124 is configured to assign a respective targeted message within the two targeted message slots (discussed in detail below).

Returning to FIG. 1, the server 118 is further communicatively coupled to a first targeted message server 126 and a second targeted message server 128 via the communication network 114. Each of the first targeted message server 126 and the second targeted message server 128 can (but does not have to) be implemented in a similar manner to the server 118. In the depicted embodiments of the present technology, the functionality of each of the first targeted message server 126 and the second targeted message server 128 may be distributed and implemented via multiple servers.

In some non-limiting embodiments of the present technology, each of the first targeted message server 126 and the second targeted message server 128 functions as a repository for one or more targeted messages (not numbered). Broadly speaking, a targeted message may be embodied in a digital advertisement, comprising one or more banner ads, image ads, media ads, etc.

First Targeted Message Server 126 & Second Targeted Message Server 128

Figure 4:
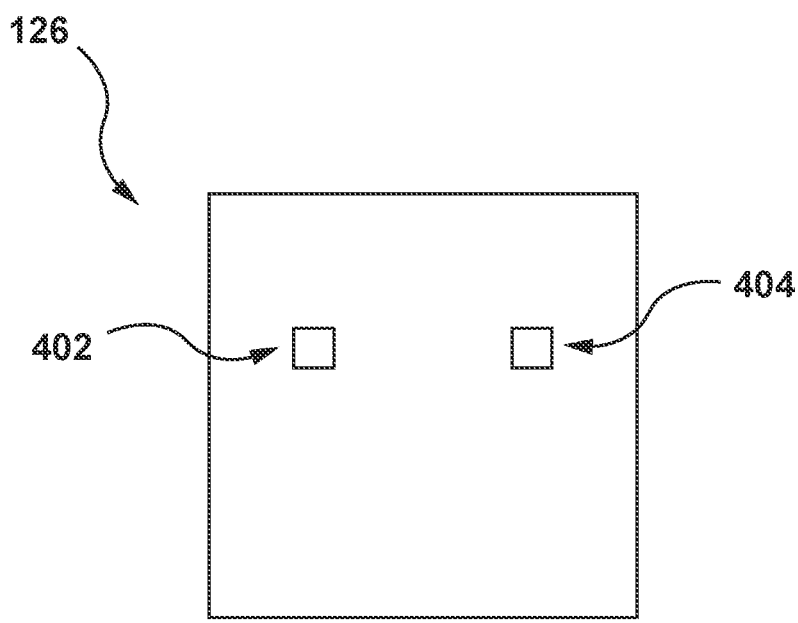
FIG. 4 is a non-limiting embodiment of an illustration of a targeted message server of the system of FIG. 1.

With reference to FIG. 4, a non-limiting schematic illustration of the first targeted message server 126 is illustrated.

The manner in which the first targeted message server 126 is populated is not limited. Just as an example, the first targeted message server 126 may receive the targeted messages from one or more advertisers (not illustrated). In some non-limiting embodiments of the present technology, the targeted messages stored within the first targeted message server 126 are pay-per-view (or pay-per-impression) targeted messages. In some non-limiting embodiments of the present technology, the targeted messages stored within the first targeted message server 126 may also include pay-per-click targeted messages.

In some non-limiting embodiments of the present technology, the first targeted message server 126 includes additional information in respect to each of the stored targeted messages. For example, the first targeted message server 126 may include may include a minimum/maximum bidding price for each targeted message, a context parameter of the targeted message (such as the topic of the targeted message), indication of the targeted message being static or dynamic and the like.

For example, the first targeted message server 126 may include a first targeted message 402 which may for example, be directed at a car advertisement, with a maximum bid price of 5 cents. On the other hand, the first targeted message server 126 may also include a second targeted message 404 which may for example, be an advertisement for a rent-a-car application with a maximum bid price of 10 cents.

Returning to FIG. 1, the advertisement application 124 is configured to select one or more targeted messages to be included within a web resource (such as the web resource 200).

More specifically, assuming that the electronic device 102 accesses the web resource 200, the web server 130 is configured to transmit a request to the advertisement application 124. The request transmitted by the web server 130 includes two requests, namely a first request for a targeted message to be included within the first slot 204 and a second request for a targeted message to be included within the second slot 206.

Generally speaking, the advertisement application 124 is configured to source, from either or both of the first targeted message server 126 and the second targeted message server 128, the targeted message to be included within the first slot 204 and the second slot 206.

In some non-limiting embodiments of the present technology, it is contemplated that the advertisement application 124 compiles a list of the requests and responses to and from the first targeted message server 126 and the second targeted message server 128.

With reference to FIG. 3, there is illustrated a processing log 300 compiled by the advertisement application 124. The processing log 300 may be stored in a database (not shown) communicatively coupled with the server 118.

The processing log 300 comprises four requests that were previously received by the advertisement application 124 (namely, a first request 302, a second request 304, a third request 306 and a fourth request 308) by one or more web resources (for example, the web resource 200). Each of the request is associated with a target context parameter 310 and a target floor price 312.

In some non-limiting embodiments of the present technology, the target context parameter 310 corresponds to a desired content for the targeted message, and the target floor price 312 corresponds to a fixed or dynamic price that is a minimum threshold for the bidding price of the targeted message. The target context parameter 310 and the target floor price 312 may be set by an administrator of the web resource that has sent the request. The bidding price on the other hand, is set by a provider of the targeted message (i.e. an advertiser).

For example, let us assume that the first request 302 was received by the web server 130. The first request 302 includes a target context parameter 310 (such as, "sport cars"), and the target floor price 312 is 5 cents. In response to receiving the first request 302 the advertisement application 124 has queried the first targeted message server 126 and has received a targeted message meeting the target context parameter 310 and the target floor price 312. In other words, the advertisement application 124 has received, a targeted message that has a context parameter that matches the target context parameter 310, and that has a bidding price that is above the target floor price 312. The advertisement application 124 then transmits the targeted message to the web server 130.

In the context of the present technology, it should be understood that the context parameter of the targeted message does not need to exactly match the target context parameter in order to be transmitted to the web server 130. It should be understood that the advertisement application 124 may be configured to determine how similar the target context parameter and the context parameter are, and in response to the similarity being above a predetermined threshold, the advertisement application 124 considers them to be a match. How the similarity is determined is known in the art and therefore will not be described in detail herein.

With reference to the second request 304, it should be mentioned that the first targeted message server 126 was unable to provide/find a targeted message that met one or more of the target context parameter 310 and the target floor price 312 of the second request 304. This could be due a plethora of factors, such as, there are no targeted message that matches the target context parameter 310 and/or that have a maximum bidding price above the target floor price 312. As such, the advertisement application 124 transmitted the second request 304 to the second targeted message server 128, which in turn, responded with a targeted message that has a context parameter that is closely related to the target context parameter 310, and that has a bidding price that is above the target floor price 312 of the second request 304.

Needless to say, although the one or more target context parameter 310 are illustrated with letters (such as "AAA"), this is done for ease of explanation. It is contemplated that the one or more target context parameter 310 be expressed as a numerical value (such as, ranging from 1 to 100) that is assigned by the advertisement application 124.

Moreover, although each previously received request is firstly sent to the first targeted message server 126, and then (if no response is received from the first targeted message server 126) to the second targeted message server 128, it is not limited as such. It is contemplated that the requests be sent first to the second targeted message server 128, or be sent to the first targeted message server 126 and the second targeted message server 128 in an alternating manner.

Although the processing log 300 only illustrates 4 requests, it is done for ease of understanding and it should be understood that the processing log 300 includes more or fewer than 4 requests.

Moreover, although the processing log 300 only illustrates an indication of the response by the first targeted message server 126 and the second targeted message server 128, it is not limited as such. It is contemplated that the processing log 300 further include, for example, a response time (in milliseconds) from the first targeted message server 126 and the second targeted message server 128, and the resulting bidding price (i.e. the bidding price of the sourced targeted message).

Now, as noted above, the advertisement application 124 would, in response to receiving the request from the web server 130, sequentially verify if each of the first targeted message server 126 and the second targeted message server 128 includes a targeted message that meets the target context parameter 310 and the target floor price 312. In other words, if the advertisement application 124 first verifies the first targeted message server 126 but finds no targeted message, it will then verify with the second targeted message server 128, and so on. If on the other hand, the first targeted message server 126 identifies a targeted message that meets the target context parameter 310 and the target floor price 312, the targeted message is transmitted to the advertisement application 124 and no request is made to the second targeted message server 128.

Needless to say, this process can take significant amount of time (as well as computational power).

Returning to FIG. 1, in some non-limiting embodiments of the present technology, the advertisement application 124 is configured to execute an MLA 136 that may resolve or at least partially mitigate the issue identified above.

MLA 136

Figure 5:
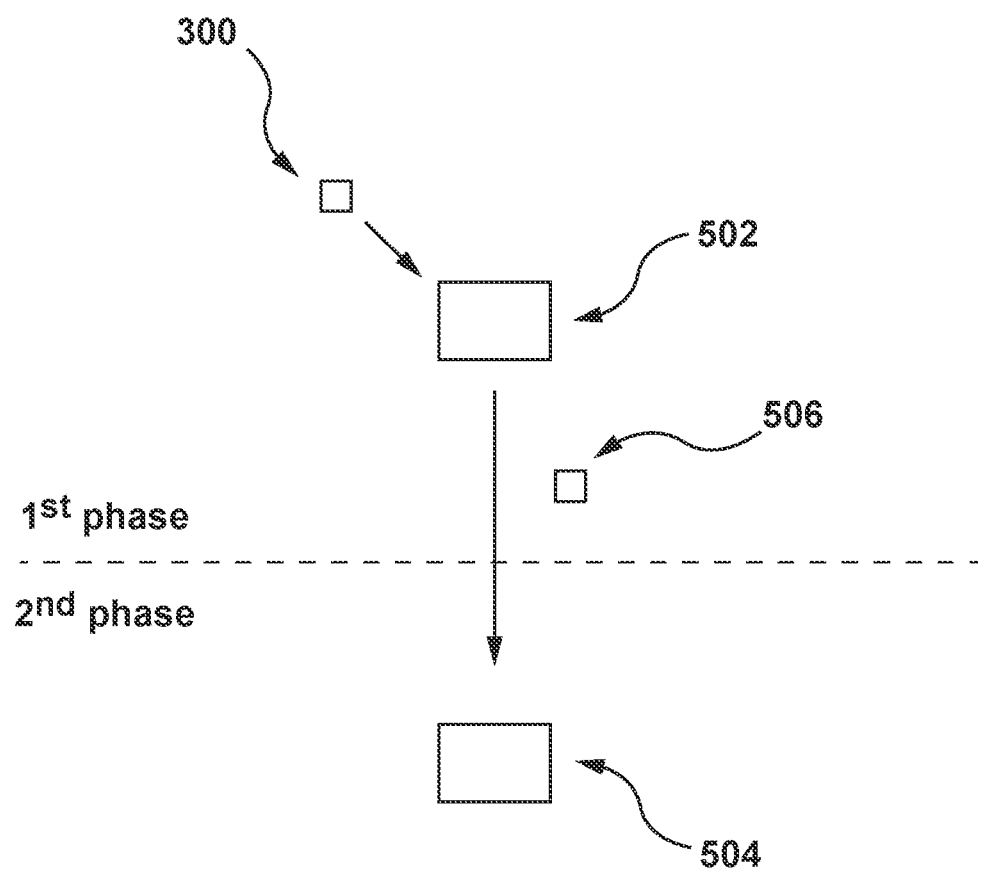
FIG. 5 depicts a schematic process of a training phase of an MLA executed in the system of FIG. 1.

With reference to FIG. 5, a schematic process of training the MLA 136 is depicted. For a better understanding of the underlying concepts of the present technology, it should be understood that the training of the MLA 136 can be broadly separated into a first phase and a second phase. In the first phase, the training input data (discussed below) is generated. In the second phase, the MLA 136 is trained using the training input data.

To train the MLA 136, the advertisement application 124 executes (or otherwise has access to): a generating routine 502 and a training routine 504.

In the context of the present specification, the term "routine" refers to a subset of the computer executable program instructions of the advertisement application 124 that is executable by the server processor 122 to perform the functions explained below in association with the various routines (the generating routine 502 and the training routine 504). For the avoidance of any doubt, it should be expressly understood that the generating routine 502 and the training routine 504 are illustrated schematically herein as separate entities for ease of the processes executed by the advertisement application 124. It is contemplated that some or all of the generating routine 502 and the training routine 504 may be implemented as one or more combined routines.

For ease of understanding the present technology, the functionality of each one of the generating routine 502 and the training routine 504, as well as data and/or information processed or stored therein are described below.

The first phase of the training is executed by the generating routine 502, and the second phase of the training is executed by the training routine 504.

Generating Routine 502

How the training input data is generated will now be explained, which begins with the generating routine 502. As recalled, the advertisement application 124 has access to the processing log 300, which is transmitted to the generating routine 502.

In response to receiving the processing log 300, the generating routine 502 is configured to (i) analyze and organize the past requests included within the processing log 300 into two groups, namely a first group that includes previous requests that have been answered (with a targeted message) by the first targeted message server 126 and a second group that includes previous requests that have been answered (with a targeted message) by the second targeted message server 128, and (ii) create the training dataset 506.

How the training dataset 506 is created is not limited.

Figure 6:
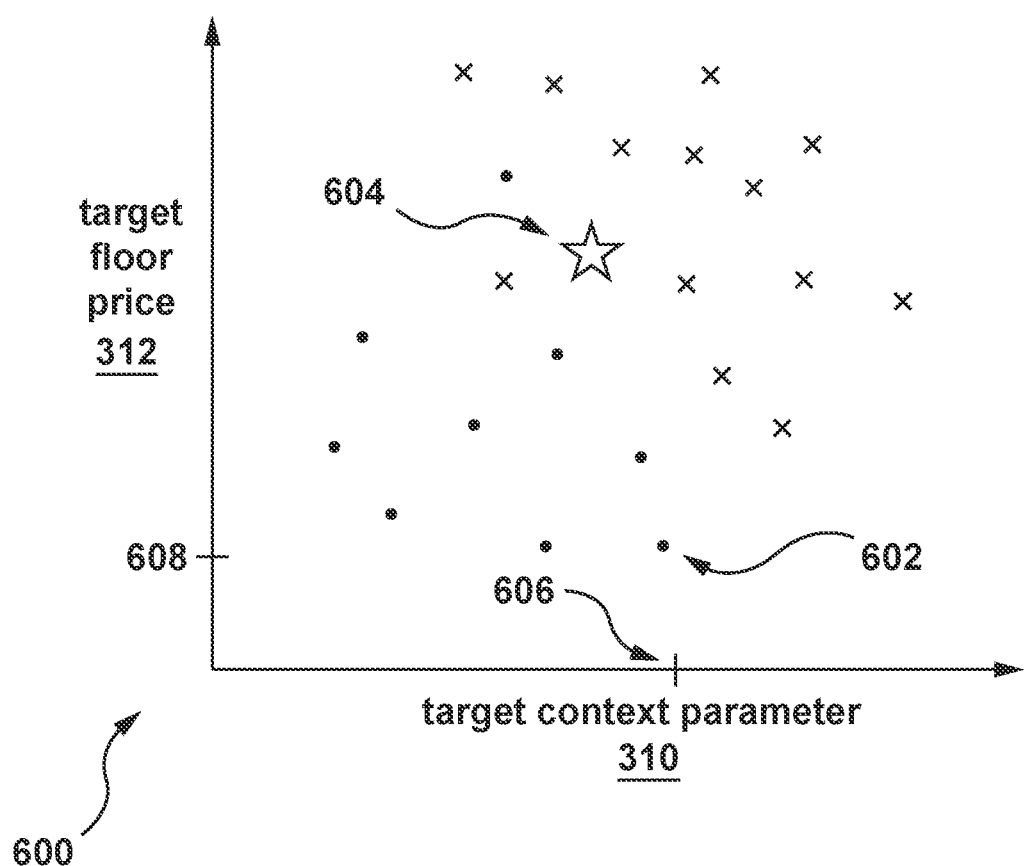
FIG. 6 is a non-limiting embodiment of an illustration of a training dataset generated in the training phase of FIG. 5.

For example, with reference to FIG. 6, the training dataset 506 may be illustrated as a X-Y graph 600, with the X axis illustrating the target context parameter 310 and the Y axis illustrating the target floor price 312. The requests included within the first group (i.e. requests that have been answered by the first targeted message server 126) are illustrated as black dots, and the requests included within the second group (i.e. requests that have been answered by the second targeted message server 128) are illustrated as X.

For example, a targeted message 602 was received from the first targeted message server 126 in response to a request having a target context parameter 310 at point 606, and a target floor price 312 at point 608.

Although the training dataset 506 is illustrated as a two-dimensional X-Y graph 600, this is merely done for ease of explanation and it should be understood that the training dataset 506 be implemented otherwise. For example, the graph 600 may be implemented as a multi-dimensional graph by including more variables (such as "dynamic" targeted messages vs. "static" targeted messages, the response time in milliseconds, the resulting bidding price, and the like).

Training Routine 504

How the MLA 136 is trained using the training dataset 506 is now explained.

The training dataset 506 is inputted into the MLA 136. The MLA 136 includes a training logic to determine a set of features associated with the training dataset.

In some non-limiting embodiments of the present technology, the set of features include a success feature, which is indicative of a relationship between the information associated with a given request (for example, the target context parameter 310 and the target floor price 312), and an outcome, which corresponds to its classification to the first group or the second group. In other words, the success feature is indicative of a link between the origin of the targeted message (i.e. whether from the first targeted message server 126 or the second targeted message server 128) and the information associated with the request (i.e. the target context parameter 310 and the target floor price 312).

Once the set of features within the training dataset 506 has been determined, the MLA 136 is configured to generate an inferred function, which is configured to determine a confidence parameter for a request from the web server 130 during the in-use phase. Broadly speaking, the confidence parameter is indicative of a likelihood of the request being met vis-a-vis the first targeted message server 126 and the second targeted message server 128. More specifically, given a particular request, the confidence parameter is indicative of the likelihood of the given request being met by the first targeted message server 126 or the second targeted message server 128. How the confidence parameter is implemented is not limited, and may for example be implemented as a numerical value within a range (for example, between 0 to 1, 1 to 10, and the like) or as a binary value.

For example, referring to FIG. 6, let us assume that a request is received during the in-use phase. Based on its target context parameter 310 and target floor price 312, the request is mapped onto the graph 600 as a star 604.

The MLA 136 is configured to generate (i) a first confidence parameter and (ii) a second confidence parameter. The first confidence parameter is indicative of a likelihood of the first targeted message server 126 responding with a target message matching the request (i.e. star 604). On the other hand, the second confidence parameter is indicative of a likelihood of the second targeted message server 128 responding with a target message matching the request (i.e. star 604).

In other words, the first confidence parameter is indicative of the first targeted message server 126 storing a target message having a context parameter that matches the target context parameter of the request (a first condition), and the same target message has a bid price above the floor price of the request (a second condition).

How the MLA 136 is configured to generate the first confidence parameter and the second confidence parameter is not limited. It is contemplated that the inferred function be based on one of a linear regression, a support vector machine, a nearest neighbour (such as K-NN), or a decision-tree model.

Figure 7:
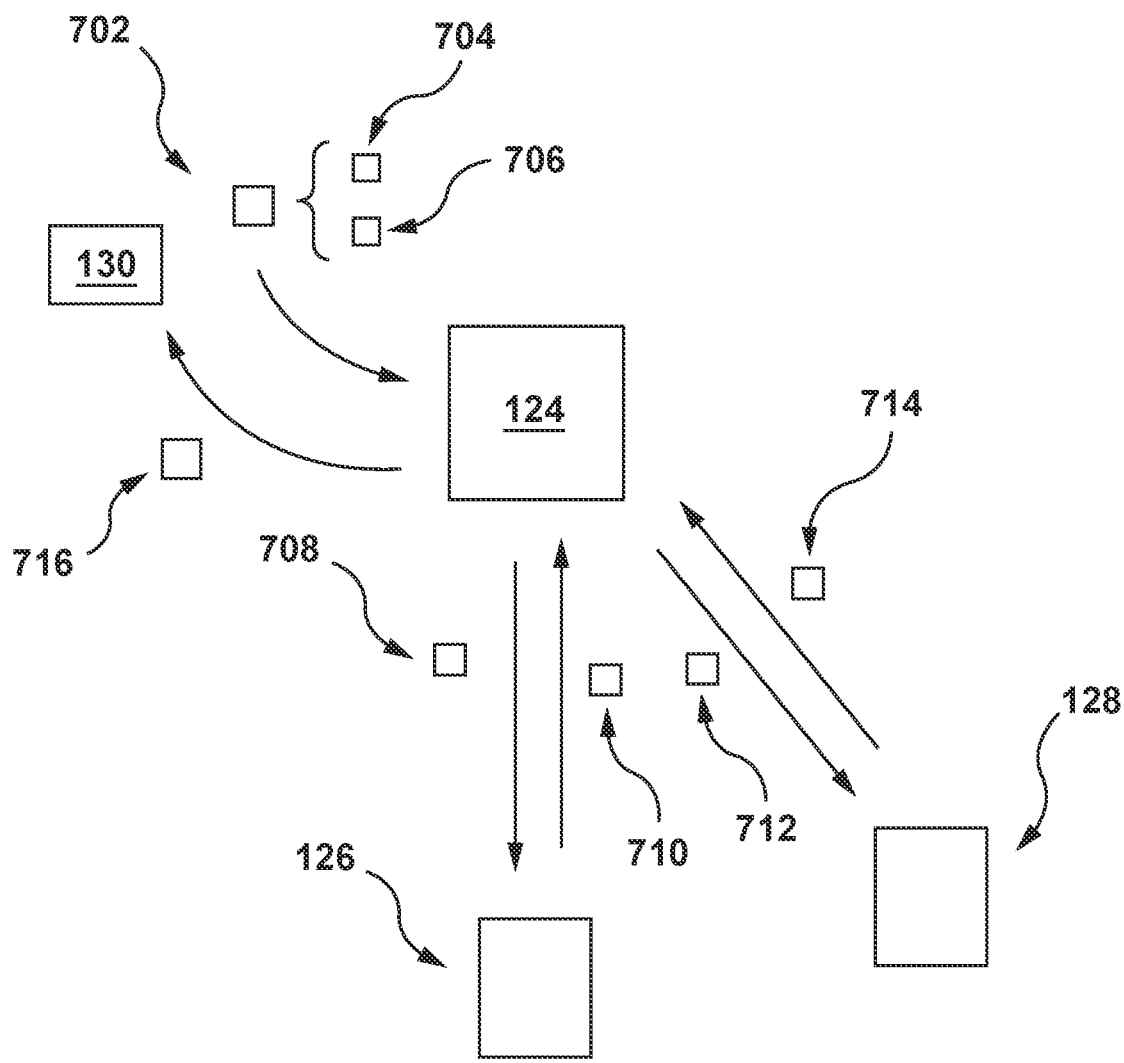
FIG. 7 is a schematic diagram of a process of the in-use phase of an advertisement application executed in the system of FIG. 1.

Turning now to FIG. 7, there is depicted a schematic diagram of a process of the in-use phrase of the advertisement application 124.

At a first step, a data packet 702 is transmitted to the advertisement application 124 from the web server 130. The data packet 702 comprises a request for one or more targeted messages to be included within a web resource (for example, the web resource 200). Additionally, the data packet 702 comprises for each of the one or more requested targeted messages, a respective target context parameter 310 and a target floor price 312.

How the data packet 702 is transmitted to the advertisement application 124 is not limited. For example, the data packet 702 may be transmitted to the advertisement application 124 in response to the electronic device 102 accessing the web resource 200 (which is stored within the web server 130).

In response to receiving the data packet 702, the advertisement application 124 is configured to generate a first confidence parameter and a second confidence parameter for each request included within the data packet 702.

For example, let us assume that the data packet 702 comprises a request for two targeted messages (namely a first requested message 704 and a second requested message 706), the advertisement application 124 is configured to, via the MLA 136, generate a first confidence parameter and a second confidence parameter for the first requested message 704 and second requested message 706, respectively.

Let us assume for the first requested message 704, the MLA 136 has calculated a first confidence parameter that is above the second confidence parameter. In other words, the MLA 136 has determined that there is a higher likelihood of the first targeted message server 126 storing a targeted message that corresponds to the first requested message 704.

On the other hand, let us assume for the second requested message 706, the MLA 136 has calculated a second confidence parameter that is above the first confidence parameter. In other words, the MLA 136 has determined that there is a higher likelihood of the second targeted message server 128 storing a targeted message that corresponds to the second requested message 706.

Now, in response to the first confidence parameter being above the second confidence parameter for the first requested message 704, the advertisement application 124 is configured to transmit a data packet 708 to the first targeted message server 126, the data packet 708 comprising the target context parameter 310 and the target floor price 312 for the first requested message 704. In other words, the data packet 708 is a request to the first targeted message server 126 to search the stored targeted messages and provide one that meets the target context parameter 310 and the target floor price 312 for the first requested message 704.

In response, the first targeted message server 126 sends back a first targeted message 710 to the advertisement application 124, which meets the target context parameter 310 and the target floor price 312 of the first requested message 704.

Similarly, in response to the second confidence parameter being above the first confidence parameter for the second requested message 706, the advertisement application 124 is configured to transmit a data packet 712 to the second targeted message server 128, the data packet 712 comprising the target context parameter 310 and the target floor price 312 for the second requested message 706. In other words, the data packet 712 is a request to the second targeted message server 128 to search the stored targeted messages and provide one that meets the target context parameter 310 and the target floor price 312 for the second requested message 706.

In response, the second targeted message server 128 sends back a second targeted message 714 to the advertisement application 124, which meets the target context parameter 310 and the target floor price 312 of the second requested message 706.

Having received the first targeted message 710 and the second targeted message 714, the advertisement application 124 transmits a data packet 716 to the web server 130. The data packet 716 comprises the first targeted message 710 and the second targeted message 714 for inclusion within the requested web resource (i.e. web resource 200).

Although the data packet 716 includes both the first targeted message 710 and the second targeted message 714, it is not limited as such. It is contemplated that the advertisement application 124 transmits the first targeted message 710 and the second targeted message 714 to the web server 130 separately, as soon as received by the first targeted message server 126 and the second targeted message server 128, respectively.

In some non-limiting embodiments of the present technology, it is contemplated that if the first targeted message server 126 is unable to identify a targeted message in response to receiving the data packet 708, then the first targeted message server 126 transmits a NULL response packet to the advertisement application 124, which causes the advertisement application to transmit the data packet 708 to the second targeted message server 128. Needless to say, it is also contemplated that instead of awaiting for the NULL response packet, the advertisement application 124 has a pre-determined time limit to receive a response from the first targeted message server 126, and if no response is received within the pre-determined time limit, the advertisement application 124 transmits the data packet 708 to the second targeted message server 128.

Although in the present description, references were made only to two targeted message servers (the first targeted message server 126 and the second targeted message server 128), it is done so for ease of understanding. It is contemplated that the first targeted message server 126 and the second targeted message server 128 be part of a plurality of targeted message servers.

Let us assume, for example, that in addition to the first targeted message server 126 and the second targeted message server 128, there is an additional third targeted message server (not shown). In response to receiving a request, the MLA 136 is configured to calculate (in addition to the first confidence parameter and the second confidence parameter), a third confidence parameter vis-a-vis the third targeted message server. The MLA 136 is then configured to transmit the request to the top-N targeted message servers with highest confidence parameter (such as the two targeted message servers that have the highest confidence parameters).

For example, assuming that the first confidence parameter and the second confidence parameter are above the third confidence parameter, the MLA 136 transmits the request to the first targeted message server 126 and the second targeted message server 128. In some non-limiting embodiments of the present technology, the MLA 136 transmits the request simultaneously to both the first targeted message server 126 and the second targeted message server 128. Alternatively, the MLA 136 transmits the request sequentially to the first targeted message server 126 and the second targeted message server 128, based on the confidence parameter. More precisely, assuming that the second confidence parameter is above the first confidence parameter, the MLA 136 transmits the request to the second targeted message server 128 prior to transmitting the request to the first targeted message server 126. The request may be transmitted to the first targeted message server 126 in response to (i) receiving a NULL response or (ii) not receiving a response for a predetermined time period, by the second targeted message server 128.

In the non-limiting embodiments of the present technology, where the MLA 136 has transmitted the request to both the first targeted message server 126 and the second targeted message server 128 simultaneously, the MLA 136 is configured to transmit back a responsive targeted message that is first received from the first targeted message server 126 and the second targeted message server 128 to the web server 130.

Although in the present description the confidence parameter has been explained as being indicative of a given targeted message server storing a targeted message that meets the first condition (i.e. matching the target context parameter) and the second condition (i.e. bid price above the floor price), it is not limited as such. It is contemplated that the confidence parameter be further indicative of which targeted message server stores a targeted message with a highest bidding price.

In other words, it is contemplated that during the training phase of the MLA 136, the training dataset 506 includes past resulting bidding prices (which are included in the processing log 300) together with the target context parameter 310 and the target floor price 312.

Figure 8:
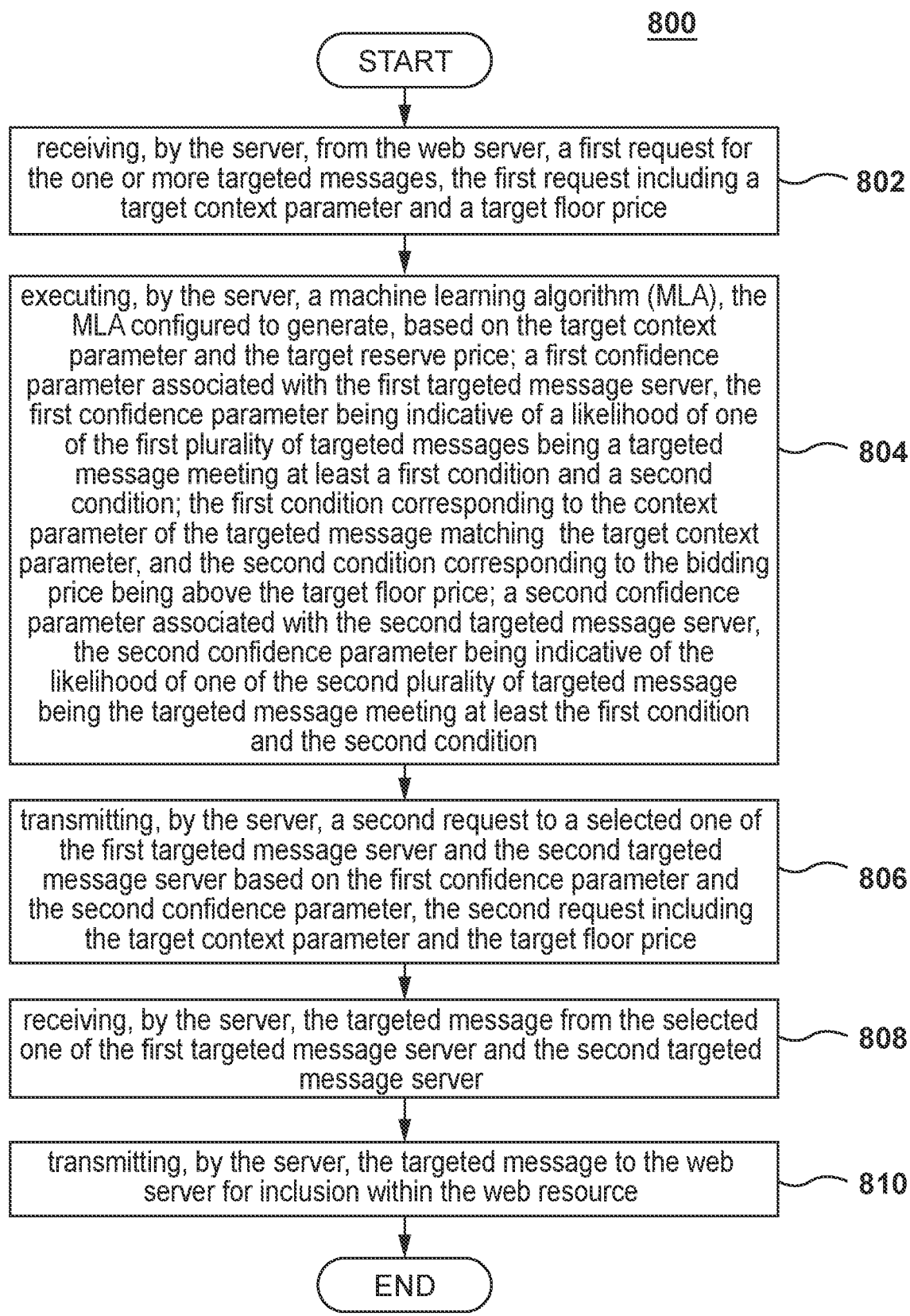
FIG. 8 depicts a block diagram of a flow chart of a method for selecting one or more targeted messages executed in the system of FIG. 1.

Given the architecture and examples provided hereinabove, it is possible to execute a computer-implemented method selecting one or more targeted messages to be included within a web resource. With reference to FIG. 8, there is depicted a flow chart of a method 800 for selecting one or more targeted messages. The method 800 being executable in accordance with non-limiting embodiments of the present technology. The method 800 can be executed by the server processor 122 of the server 118.

Step 802: Receiving, by the Server, from the Web Server, a First Request for the One or More Targeted Messages, the First Request Including a Target Context Parameter and a Target Floor Price The method 800 starts at step 802. At step 802, a data packet 702 is transmitted to the advertisement application 124 from the web server 130. The data packet 702 comprises a request for one or more targeted messages to be included within a web page (for example, the web resource 200). Additionally, the data packet 702 comprises for each of the one or more requested targeted messages, a respective target context parameter and a target floor price.

How the data packet 702 is transmitted to the advertisement application 124 is not limited. For example, the data packet 702 may be transmitted to the advertisement application 124 in response to the electronic device 102 accessing the web resource 200.

Step 804: Executing, by the Server, a Machine Learning Algorithm (MLA), the MLA Configured to Generate, Based on the Target Context Parameter and the Target Reserve Price; a First Confidence Parameter Associated with the First Targeted Message Server, the First Confidence Parameter being Indicative of a Likelihood of One of the First Plurality of Targeted Messages being a Targeted Message Meeting at Least a First Condition and a Second Condition; the First Condition Corresponding to the Context Parameter of the Targeted Message Matching the Target Context Parameter, and the Second Condition Corresponding to the Bidding Price being Above the Target Floor Price; a Second Confidence Parameter Associated with the Second Targeted Message Server, the Second Confidence Parameter being Indicative of the Likelihood of One of the Second Plurality of Targeted Message being the Targeted Message Meeting at Least the First Condition and the Second Condition At step 804, in response to receiving the data packet 702, the advertisement application 124 is configured to generate a first confidence parameter and a second confidence parameter for each request included within the data packet 702.

For example, let us assume that the data packet 702 comprises a request for two targeted messages (namely a first requested message 704 and a second requested message 706), the advertisement application 124 is configured to, via the MLA 136, generate a first confidence parameter and a second confidence parameter for the first requested message 704 and second requested message 706 respectively.

The first confidence parameter is indicative of the first targeted message server 126 storing a target message that has a context parameter that matches the target context parameter of the request (a first condition), and the same target message has a bid price above the floor price of the request (a second condition).

Step 806: Transmitting, by the Server, a Second Request to a Selected One of the First Targeted Message Server and the Second Targeted Message Server Based on the First Confidence Parameter and the Second Confidence Parameter, the Second Request Including the Target Context Parameter and the Target Floor Price At step 806, let us assume for the first requested message 704, the MLA 136 has calculated a first confidence parameter that is above the second confidence parameter.

On the other hand, let us assume for the second requested message 706, the MLA 136 has calculated a second confidence parameter that is above the first confidence parameter.

Now, in response to the first confidence parameter being above the second confidence parameter for the first requested message 704, the advertisement application 124 is configured to transmit a data packet 708 to the first targeted message server 126, the data packet 708 comprising the target context parameter and the target floor price for the first requested message 704. In other words, the data packet 708 is a request to the first targeted message server 126 to search the stored targeted messages and provide one that meets the target context parameter and the target floor price for the first requested message 704.

Similarly, in response to the second confidence parameter being above the first confidence parameter for the second requested message 706, the advertisement application 124 is configured to transmit a data packet 712 to the second targeted message server 128, the data packet 712 comprising the target context parameter and the target floor price for the second requested message 706. In other words, the data packet 712 is a request to the second targeted message server 128 to search the stored targeted messages and provide one that meets the target context parameter and the target floor price for the second requested message 706.

Step 808: Receiving, by the Server, the Targeted Message from the Selected One of the First Targeted Message Server and the Second Targeted Message Server At step 808, in response to receiving the data packet 708, the first targeted message server 126 sends back a first targeted message 710 to the advertisement application 124, which meets the target context parameter and the target floor price of the first requested message 704.

In response to receiving the data packet 712, the second targeted message server 128 sends back a second targeted message 714 to the advertisement application 124, which meets the target context parameter and the target floor price of the second requested message 706.

Step 810: Transmitting, by the Server, the Targeted Message to the Web Server for Inclusion within the Web Resource At step 810, in response to receiving the first targeted message 710 and the second targeted message 714, the advertisement application 124 transmits a data packet 716 to the web server 130. The data packet 716 comprises the first targeted message 710 and the second targeted message 714 for inclusion within the requested web resource 200.

The method 800 then terminates.

It should be apparent to those skilled in the art that at least some embodiments of the present technology aim to expand a range of technical solutions for addressing a particular technical problem encountered by the conventional method of training a MLA.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method of training a machine-learning algorithm (MLA) for determining a targeted message server storing one or more targeted messages to be included within a web resource hosted by a web server, the web server being communicatively coupled to a first targeted message server and a second targeted message server, the first targeted message server storing a first plurality of targeted messages and the second targeted message server storing a second plurality of targeted messages;

each targeted message of the first plurality of targeted messages and second plurality of targeted messages being associated with a context parameter and a bid price;

the method comprising:

generating a training dataset by:
retrieving from a database, a processing log, the processing log comprising:
one or more previously received requests for targeted messages, each of the one or more previously received requests including a respective target context parameter and a respective target floor price,
the one or more previously received requests having been previously completed by at least one of the first targeted message server and the second targeted message server; and
the respective target context parameter comprising a topic of a given targeted message responsive to a respective previously received request;
inputting the training dataset to the MLA, thereby determining a set of features associated with the training dataset, the set of features including at least:
(i) the respective target context parameter and the respective target floor price of a given previously received request, (ii) a respective previously identified targeted message responsive to the given previously received request, and (iii) a success feature indicating which of the first targeted message server or the second targeted message server stored the respective previously identified targeted message;

generating an inferred function based on the set of features, the inferred function being configured, during an in-use phase, to enable the MLA to determine, from the first and second targeted message servers, the targeted message server storing the one or more targeted message to be included within the web resources, the determining comprising:
  receiving, from the web server, a first request for the one or more targeted messages, the first request including a target context parameter and a target floor price;
  applying, by the server, to the target context parameter and target floor price, the inferred function to determine:
    a first confidence parameter indicative of a first likelihood value of the first targeted message server storing a targeted message meeting at least a first condition and a second condition; the first condition corresponding to the context parameter of the targeted message matching the target context parameter, and the second condition corresponding to the bidding price being above the target floor price;
    a second confidence parameter indicative of a second likelihood value of the second targeted message server storing the targeted message meeting at least the first condition and the second condition;
  transmitting a second request only to a selected one of the first targeted message server and the second targeted message server based on the first confidence parameter and the second confidence parameter, the second request including the target context parameter and the target floor price;
  receiving the targeted message from the selected one of the first targeted message server and the second targeted message server; and
  transmitting the targeted message to the web server for inclusion within the web resource.

2. The method of claim 1, wherein the transmitting the second request to the selected one of the first targeted message server and the second targeted message server based on the first confidence parameter and the second confidence parameter comprises transmitting the second request to the first targeted message server in response to the first confidence parameter being above the second confidence parameter.

3. The method of claim 2, wherein the method further comprises, in response to receiving the targeted message meeting the first condition and the second condition from the first targeted message server, not transmitting any request to the second targeted message server.

4. The method of claim 2, the method further comprising:
  receiving, from the selected one of the first targeted message server and the second targeted message server, a response packet indicative of the first plurality of targeted messages not including the targeted message meeting at least the first condition and the second condition;
  transmitting the second request to another one of the first targeted message server and the second targeted message server.

5. The method of claim 1, wherein the receiving the first request is executed in response to an electronic device accessing the web resource.

6. The method of claim 1, wherein:
  the one or more previously received requests for targeted messages comprise a first set of previously received requests, the first set of previously received requests having been transmitted to the first targeted message server;
  the first success parameter being generated based on:
    analyzing, for each of the previously received requests included within the first set of previously received requests, a presence of a response packet including a respective targeted message for each of the previously received requests meeting the respective first condition and the second condition.

7. The method of claim 1, wherein the first targeted message server and the second targeted message server is part of a plurality of targeted message servers, and wherein the transmitting the second request to the selected one of the first targeted message server and the second targeted message server comprises transmitting the second request to the both of the first targeted message server and the second targeted message server in response to the first confidence parameter and the second confidence parameter being higher than other confidence parameters associated with other ones of the plurality of targeted message servers.

8. The method of claim 7, wherein the method comprises accepting a first response from one of the first targeted message server and the second targeted message server, the first response being an earlier received one.

9. The method of claim 8, wherein the first confidence parameter and the second confidence parameter being higher than other confidence parameters associated with other ones of the plurality of targeted message servers is indicative of a higher likelihood of receiving a response with a higher floor price.

10. The method of claim 8, wherein the transmitting the second request to both the first targeted message server and the second targeted message server comprises transmitting the second request simultaneously to both the first targeted message server and the second targeted message server.

11. The method of claim 8, wherein the transmitting the second request to both the first targeted message server and the second targeted message server comprises transmitting the second request to each one of the first targeted message server and the second targeted message server in a sequence, the sequence being based on values of associated the first confidence parameter and the second confidence parameter.

12. A system for training a machine-learning algorithm (MLA) for determining a targeted message server storing one or more targeted messages to be included within a web resource hosted by a web server; the web server being communicatively coupled to a first targeted message server and a second targeted message server,
  the first targeted message server storing a first plurality of targeted messages and the second targeted message server storing a second plurality of targeted messages;
  each targeted message of the first plurality of targeted messages and second plurality of targeted messages being associated with a context parameter and a bid price;
  the system comprising at least one processor and at least one non-transitory computer-readable medium comprising executable instructions, which, when executed by the at least one processor, cause the system to:
  generate a training dataset by:
    retrieving, from a database, a processing log, the processing log comprising:
      one or more previously received requests for targeted messages, each of the one or more previously received requests including a respective target context parameter and a respective target floor price,
  the one or more previously received requests having been previously completed by at least one of the first targeted message server and the second targeted message server; and
  the respective target context parameter comprising a topic of a given targeted message responsive to a respective previously received request;
inputting the training dataset to the MLA, thereby determining a set of features associated with the training dataset, the set of features including at least:
  (i) the respective target context parameter and the respective target floor price of a given previously received request, (ii) a respective previously identified targeted message responsive to the given previously received request, and (iii) a success feature indicating which of the first targeted message server or the second targeted message server stored the respective previously identified targeted message;
generating an inferred function based on the set of features, the inferred function being configured, during an in-use phase, to enable the MLA to determine, from the first and second targeted message servers, the targeted message server storing the one or more targeted message to be included within the web resources, by:
  receiving, from the web server, a first request for the one or more targeted messages, the first request including a target context parameter and a target floor price;
  applying, to the target context parameter and target floor price, the inferred function to determine:
    a first confidence parameter indicative of a first likelihood value of the first targeted message server storing, being a targeted message meeting at least a first condition and a second condition;
      the first condition corresponding to the context parameter of the targeted message matching the target context parameter, and the second condition corresponding to the bidding price being above the target floor price;
    a second confidence parameter indicative of a second likelihood value of the second targeted message server storing the targeted message meeting at least the first condition and the second condition;
  transmitting, a second request only to a selected one of the first targeted message server and the second targeted message server based on the first confidence parameter and the second confidence parameter, the second request including the target context parameter and the target floor price;
  receiving, the targeted message from the selected one of the first targeted message server and the second targeted message server; and
  transmitting, the targeted message to the web server for inclusion within the web resource.

13. The system of claim 12, wherein to transmit the second request to the selected one of the first targeted message server and the second targeted message server based on the first confidence parameter and the second confidence parameter, the at least one processor further causes the system to transmit the second request to the first targeted message server in response to the first confidence parameter being above the second confidence parameter.

14. The system of claim 13, wherein the at least one processor further causes the system to, in response to receiving the targeted message meeting the first condition and the second condition from the first targeted message server, not transmit any request to the second targeted message server.

15. The system of claim 13, wherein the at least one processor further causes the system to:
  receive, from the selected one of the first targeted message server and the second targeted message server, a response packet indicative of the first plurality of targeted messages not including the targeted message meeting at least the first condition and the second condition;
  transmit the second request to another one of the first targeted message server and the second targeted message server.

16. The system of claim 12, wherein the at least one processor causes the system to receive the first request in response to an electronic device accessing the web resource.

17. The system of claim 12, wherein the first targeted message server and the second targeted message server is part of a plurality of targeted message servers, and wherein to transmit the second request to the selected one of the first targeted message server and the second targeted message server, the at least one processor further causes the system to transmit the second request to both the first targeted message server and the second targeted message server in response to the first confidence parameter and the second confidence parameter being higher than other confidence parameters associated with other ones of the plurality of targeted message servers.

18. The system of claim 17, wherein the at least one processor further causes the system to accept a first response from one of the first targeted message server and the second targeted message server, the first response being an earlier received one.

* * * * *